Dec. 6, 1955   B. D. BOITNOTT ET AL   2,726,104
PIPE JOINT SWIVEL WITH FLUID SEAL
Filed Nov. 17, 1952   2 Sheets-Sheet 2
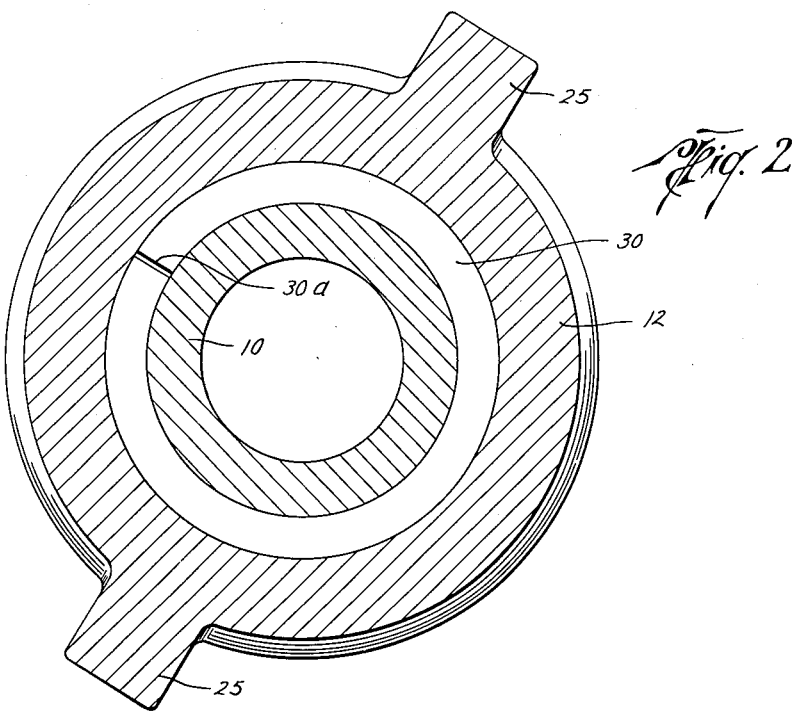
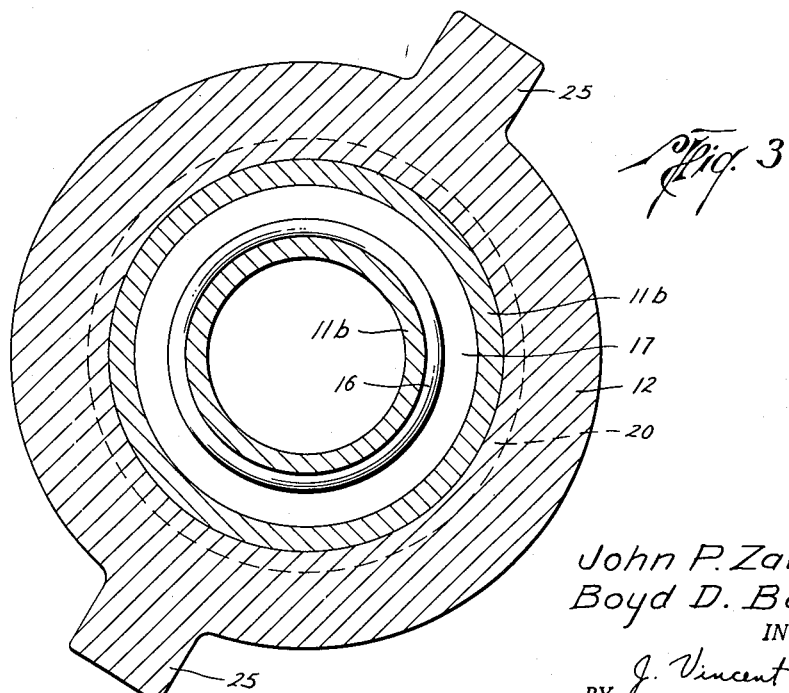
John P. Zawacki
Boyd D. Boitnott
INVENTORS
BY J. Vincent Martin
Joe E. Edwards
B. R. Pravel
ATTORNEYS United States Patent Office 2,726,104
Patented Dec. 6, 1955

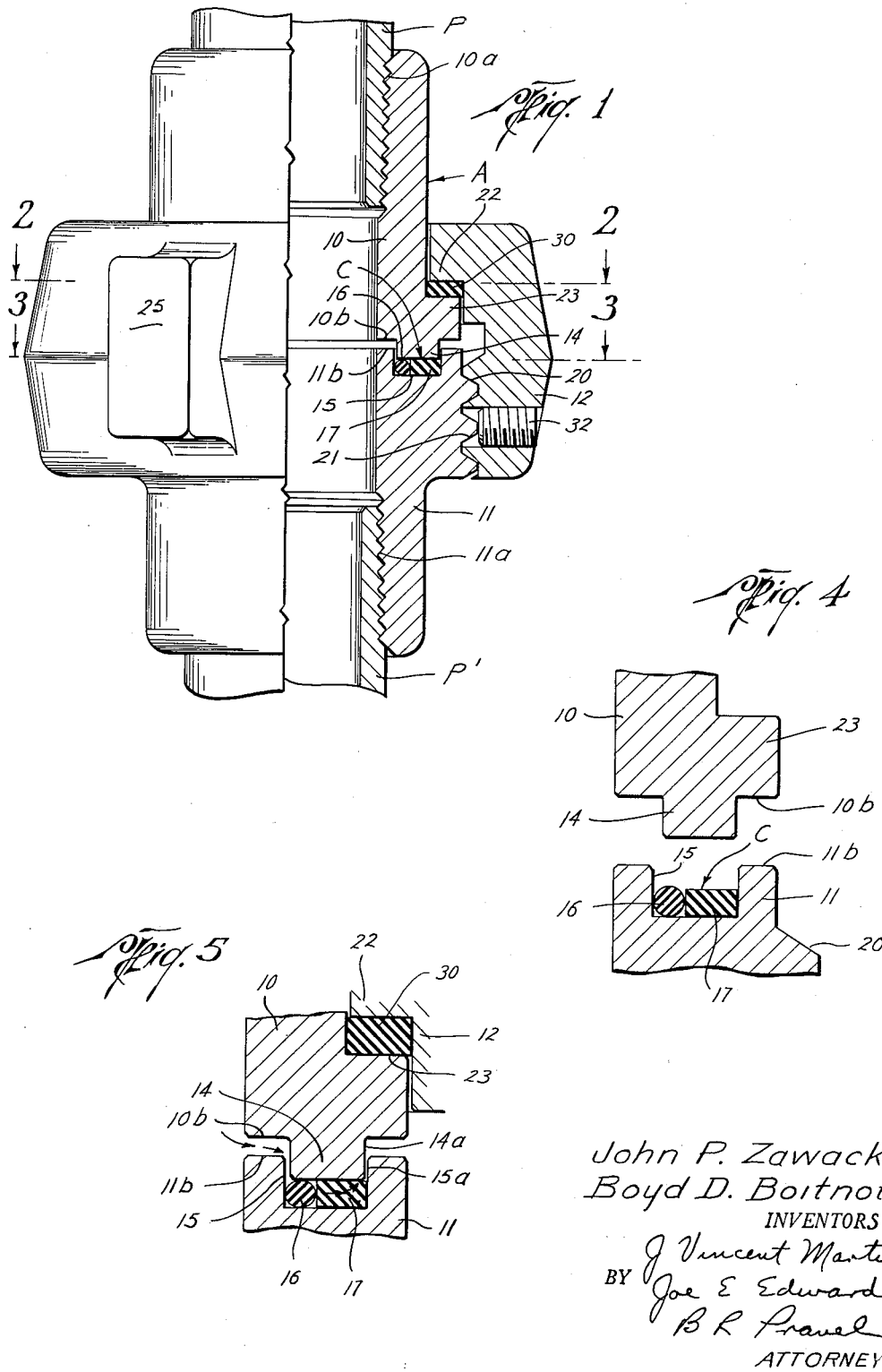

2,726,104

PIPE JOINT SWIVEL WITH FLUID SEAL

Boyd D. Boitnott and John P. Zawacki, Houston, Tex., assignors to Oil Center Tool Company, Houston, Tex., a corporation of Texas Application November 17, 1952, Serial No. 320,902

3 Claims. (Cl. 285—96.1)

This invention relates to new and useful improvements in swivels, and seals for same.

In swivels for connecting together sections of pipe through which fluids pass, difficulties have arisen with respect to the seal which must be provided between parts of the swivel which are rotatable relative to each other. The seal is provided to prevent the fluid in the pipe from escaping at the swivel and such seal is ordinarily made of an elastic material such as rubber. The inherent elasticity of the rubber provides an effective seal, but ordinarily the rotatable parts of the swivel are made of metal and the dry rubber has a high coefficient of friction on the metal, with the result that when sufficient pressure is applied to the rubber to form an effective seal, the friction between the rubber seal and the metal parts is so great it interferes with the rotational movement of the swivel.

Also, when an elastic or rubber seal member is employed in a swivel between the parts thereof which are rotatable relative to each other, the pressure of the fluid passing through the bore of the swivel tends to extrude the rubber between said parts with a resultant weakening and failure of said seal member.

It is therefore an object of this invention to provide a swivel having a seal between parts thereof which are rotatable relative to each other which seal has all of the advantages of an elastic or rubber seal and additionally overcomes the disadvantage of the high coefficient of friction on said parts, whereby an efficient sealing is effected in the swivel without substantially interfering with the rotating action thereof.

An important object of this invention is to provide a swivel which has a seal between the parts which are rotatable relative to each other, wherein the seal includes an annular elastic packing member and a yieldable or plastically deformable sealing and thrust member having a low coefficient of friction when in a dry state, said packing member cooperating with said sealing member to urge said sealing member into a deformed sealing position between said parts.

Another object of this invention is to provide a swivel having two adjacent tubular end members and a coupling holding said end members together, one of said end members having an annular groove therein within which is disposed an elastic ring and an annular deformable plastic sealing member adjacent thereto, such elastic ring and plastic sealing member being confined in said groove by the other of said end members but leaving access for fluid to pass from the bore of the end members to contact the elastic ring, whereby fluid passing through said swivel forces said elastic ring against said plastic member to deform same into sealing engagement without extrusion thereof and without substantially interfering with the rotatable swivel action between said end members.

Still another object of this invention is to provide a swivel having adjacent tubular end members and a coupling holding said end members together, said end members having a combination elastic ring and deformable plastic sealing member serving to seal between said end members, and said coupling and one of said end members which is rotatable relative thereto having a plastic low-coefficient of friction thrust bearing therebetween, said bearing being split to provide for replacement without removing the swivel from the pipe line in which it is connected.

The construction designed to carry out the invention will be hereinafter described together with other features thereof. The invention will be more readily understood from a reading of the following specifications and by reference to the accompanying drawing forming a part thereof, wherein an example of the invention is shown, and wherein:

Figure 1 is a view, partly in section and partly in elevation, illustrating the details of the swivel and the seal of this invention.

Figure 2 is a horizontal sectional view taken on line 2—2 of Figure 1.

Figure 3 is a horizontal sectional view taken on line 3—3 of Figure 1.

Figure 4 is a partial sectional view illustrating the mating annular rib and annular groove for positioning with the seal and thrust means therebetween.

Figure 5 is a view similar to Figure 4, except that the end members of the swivel are shown assembled or coupled together by the coupling member.

In the drawings, the letter A designates generally the swivel of this invention. This swivel A has end members 10 and 11 which are tubular in construction and are disposed adjacent each other. The first end member 10 has internal threads 10a for connection with a section of a line or conductor designated by the letter P while the second tubular end member 11 has internal threads 11a for connection with another line or conductor P'; the conductor P may be the usual mud line hose of a drilling rig while conductor P' may be drill pipe so that the swivel sets up the connection for directing the usual drilling mud to the drill pipe while permitting rotation of the latter. However, the invention is not to be limited to this use since the swivel A may be employed for connecting any two conductors where it is desirable that one conductor be rotatable relative to the other.

The swivel A also includes a coupling member 12 which connects the tubular end members 10 and 11 while permitting relative rotation therebetween. In the form of the invention shown in the drawings, the end member 10 will rotate relative to the end member 11 and with respect to the coupling member 12. This rotational movement of the end member 10 and the conductor P connected therewith is facilitated by a seal and thrust means, designated by the letter C disposed between lateral surfaces of the adjacent ends of the tubular members 10 and 11. This seal and thrust means C not only provides a fluid seal between the ends of the tubular members 10 and 11, but as will be explained, by the nature of the material used, such seal and thrust means provides for a low frictional contact between the ends of the tubular end members 10 and 11 so that relatively frictionless rotational movement between the end members 10 and 11 is possible.

The details of the swivel A of this invention are best seen in Figure 1 of the drawings. As illustrated therein the end 10b of the tubular end member 10 and the end 11b of the tubular end member 11 are adjacent to each other and are spaced apart so that there is no metal to metal contact between the end members 10 and 11. The end 10b has an annular rib 14 which extends downwardly as shown in Figure 1 and is of a slightly smaller width than a groove 15 in the end 11b of the end member 11. The lateral surfaces of the rib 14 and the groove 15 are maintained in spaced relationship by the seal and thrust means C.

The seal and thrust means C is clearly shown in Figures 4 and 5 and includes an elastic or rubber packing ring 16 which is disposed in the inner portion of the groove 15. Adjacent to the packing ring 16 there is disposed a plastically deformable seal and thrust ring or substantially frictionless bearing 17 which is preferably considerably wider than the width of the packing ring 16 and therefore its upper surface provides the major thrust or bearing surface between the lateral surface of the rib 14 and the seal and thrust means C.

The thrust and seal ring is constructed of a material 17 which has a low coefficient of friction and has excellent sealing properties; also the use of lubricants such as oil or grease to assure efficient sealing is not required. However, although the material is plastically deformable it does not have the inherent elasticity of rubber and therefore, after extended deformation it will not return to its initial undeformed condition upon release of the forces which originally deformed it. As an example of one type of material which may be employed for the seal and thrust ring 17, reference is made to the material identified as "Teflon" and manufactured by E. I. du Pont de Nemours & Company of New Jersey. "Teflon" is a trademark applied to the polymers of tetrafluoroethylene. This material, polytetrofluoroethylene, has no true melting point and may operate over an excessively wide range of temperatures which extend from minus 100 degrees Fahrenheit to 480 degrees Fahrenheit. The material is substantially chemically inert and withstands the attack of all materials and strong alkalies with the possible exception of molten alkali metals. It has an extremely low coefficient of friction with metal so that when in close sealing engagement with the metal, it does not resist the movement of said metal with respect thereto as would be the case in a rubber or similar material packing which, as is well known, has an extremely high coefficient of friction when in a dry state.

Such material is readily deformable to form the sealing contact between the swivel parts 14 and 15, but as above pointed out it lacks the property of inherent elasticity. Thus, when in sealing engagement with a part, sealing is efficient until some wear of the material occurs and, unless additional deformation pressure is applied, a leak would result. The present invention combines the advantages of the material of the ring 17 with the rubber ring 16 so that the inherent elasticity of the rubber maintains the necessary force applied to ring 17 to assure proper sealing at all times.

The fluid pressure in the conductor to which the swivel is connected will act from within the bore of the swivel and pass between the ends 10b and 11b on their inner portion, and due to the fact that the rib 14 is of a reduced thickness as compared to the groove 15 (Figure 5), the fluid pressure will pass into the groove on the inner surface thereof and act against the annular packing ring 16 to force it outwardly to apply outward pressure to the seal and thrust ring 17 and thereby deform it into sealing engagement with the under surface of the rib 14 and the bottom of the groove 15.

The rubber ring is constantly under pressure and maintains a force applied to the ring 17 so that any wear of the upper surface of the ring is automatically compensated for by additional deformation of the material of the ring 17. The invention thus utilizes the advantages of the rubber ring and the advantages of the Teflon ring 17 without the disadvantages of either. Since the Teflon ring forms the major bearing surface the frictional resistance to rotation is minimized.

Another particularly important property of the seal and thrust material used in the ring 17 is that such plastic material does not extrude out through the vertical opposed surfaces 14a and 15a at the outer end of the groove 15 and the rib 14, as would occur with a rubber or rubberlike material. Such extrusion of a rubber or rubberlike material is therefore avoided in this construction without losing the advantages of the elastic properties of the packing ring 16. Extrusion between the vertical surfaces 14a and 15a is especially undesirable because it weakens the seal and interferes with the rotation between the tubular end members 10 and 11 of the swivel A.

As pointed out above, the end members 10 and 11 are held together by a coupling member 12. This coupling member has threads 20 which mate with threads 21 of the tubular end member 11. The upper end of the coupling member 12 has an inner lateral lip 22 which is adapted to overhang a flange 23 extending radially outwardly on the tubular end member 10. The coupling member 12 is provided with lugs 25 to enhance the threading of the coupling member 12 onto the end member 11 by threading of the threads 20 with the threads 21. A thrust ring is provided on the upper surface of the flange 23 and below the lip 22 of the coupling member 12 to provide for frictionless rotation between the parts 10 and 12. The thrust ring is designated by the numeral 30 and is preferably formed of the same material as the seal and thrust member 17, namely, "Teflon." The thrust ring 30 does not have to seal the connection between the coupling member 12 and the end member 10, but serves only to reduce the friction between such parts during relative rotation therebetween. As pointed out above, the low coefficient of friction of the Teflon with the metal of the coupling member 12 and the end member 10 provides for substantially frictionless contact when the Teflon is in a dry state. That is, no lubricant such as grease or oil is necessary to obtain the substantially frictionless contact between the thrust ring 30 and the members 10 and 12.

As seen in Figure 2, the thrust ring 30 is split at 30a whereby upon a disengagement of the threads 20 and 21 and a sliding of the coupling member 12 upwardly with respect to the end member 10, the thrust ring 30 will be exposed and can be slipped from the tubular end member 10 for replacement, without the necessity of disconnecting the end members 10 and 11. Thus, the thrust ring 30 can be replaced without breaking the seal provided by the seal and thrust means C.

It will be observed in Figure 1 that the coupling member 12 has a set screw or locking screw 32 which threads radially inwardly into contact with the threads 21 on the end member 11 to lock the coupling member 12 in the coupled position. Suitable means, such as a notch in the head of the screw 32 (not shown) can be provided for threading the screw 32 into contact with the threads 21. It will also be appreciated that other conventional locking means can be utilized in place of the screw 32.

From the foregoing, it is believed evident that a swivel has been provided which has adequate and efficient sealing between the end members 10 and 11 and also has efficient substantially friction-less contact with the seal and thrust means and the seal ring 30, whereby efficient swiveling or relative rotation between the parts is effected. In the seal and thrust means C of the present invention, all of the advantages of the elastic or rubber packing ring 16 are combined with all of the advantages of the plastically deformable seal and thrust ring 17, without the inherent disadvantages of either individually. In other words, by the combination of the elastic packing ring 16 and the "Teflon" seal and thrust member 17, the disadvantage of the high coefficient of friction between the rubber and the metal is avoided as would be present if only the packing ring 16 were utilized. Also the extrusion of the rubber of the packing ring 16 between the vertical surfaces 14a and 15a is avoided by the use of the Teflon member 17 rather than a rubber ring alone. The Teflon member provides for the high degree of sealing between the end members 10 and 11, but is deformable and incapable of returning to its original shape subsequent to sustained deformation. This disadvantage of the Teflon is overcome by the use of the elastic or rubber packing ring 16 in conjunction therewith. It is preferable that the packing ring 16 be placed under pre-load by tightening of the coupling member 12 to urge the upper end member 10 closer to the end member 11 to slightly compress the packing ring 16 and to urge the Teflon member 17 radially outwardly into a pre-loaded sealing condition. Thereafter as the fluid pressure in the pipe and the bore of the swivel acts on the inner surface of the packing ring 16, the changes in the fluid pressure will be transmitted to deform the seal and thrust member 17 accordingly.

Although the seal and thrust member 17 has been designated as made of a material such as "Teflon," it will be appreciated that such material of the member 17 may be any material having a low coefficient of friction with the end members 10 and 11 and yet be capable of sealing between such members. Also the packing ring 16, although preferably made of rubber or a rubberlike material, could be made of any elastic material which is capable of sealing but has the property of returning to its original shape even after sustained deformation or pressure having been applied thereto. Also the thrust ring 30, although preferably made of "Teflon" could be made of any suitable material which has a low coefficient of friction with the parts 10 and 12 with which it contacts.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. A swivel including, a first tubular end member having a substantially flat radially extending end surface with an annular groove therein, a second tubular end member having a substantially flat radially extending end surface with an annular axially extending rib on the end surface of said second member, an elastic packing ring and an annular seal and thrust member disposed in the same plane in said groove against each other laterally of the groove, said elastic packing ring being radially inwardly of said seal and thrust member, a coupling member connecting said end members together to permit said end members to rotate relative to each other, said annular rib contacting said ring and said seal and thrust member, the axial length of said rib plus the thickness of said seal and thrust member being greater than the depth of the groove, said seal and thrust member being a material which is deformable under pressure to form a fluid seal, said elastic ring being confined by said rib in said groove to pre-load same to apply a uniform pressure or load to said seal and thrust member to form the fluid seal between said end members, one of said end members having an external annular flange thereon, the other of said members having means thereon securing the coupling member thereto, said coupling member having an inner, annular shoulder, and a thrust bearing ring between the shoulder on said coupling member and the annular flange on the said one member, said thrust bearing ring being on the axial end of said flange away from said packing ring and said seal and thrust member, said thrust bearing ring being of a material having a low coefficient of friction in a dry state with the material of the coupling member and the end member it contacts.

2. The swivel set forth in claim 1, wherein said thrust bearing ring is split and said coupling member is releasable from said members, whereby said thrust bearing ring may be readily replaced without removing the swivel from a pipe line in which it is connected.

3. The swivel set forth in claim 1, wherein said seal and thrust member and said thrust bearing ring are made of polytetrafluoroethylene.

References Cited in the file of this patent

UNITED STATES PATENTS

| | | |
|---|---|---|
| 1,015,904 | Niederlander | Jan. 30, 1912 |
| 1,027,586 | Breaker | May 28, 1912 |
| 1,125,642 | Blanchard | Jan. 19, 1915 |
| 1,334,130 | Blanchard | Mar. 16, 1920 |
| 1,450,126 | Wilson | Mar. 27, 1923 |
| 2,195,003 | Danvers | Mar. 26, 1940 |
| 2,494,598 | Waring | Jan. 17, 1950 |
| 2,567,527 | Parks | Sept. 11, 1951 |

OTHER REFERENCES

Teflon—Product Engineering of September 1952, pages 149 to 153.